United States Patent
Chen

(10) Patent No.: US 12,384,089 B2
(45) Date of Patent: Aug. 12, 2025

(54) PROCESS OF POLYVINYL CHLORIDE (PVC) CLADDING WOOD

(71) Applicant: SHANGHAI KENDA INDUSTRIAL CO., LTD., Shanghai (CN)

(72) Inventor: Hengcai Chen, Shanghai (CN)

(73) Assignee: SHANGHAI KENDA INDUSTRIAL CO., LTD., Shanghai (CN)

( * ) Notice: Subject to any disclaimer, the term of this patent is extended or adjusted under 35 U.S.C. 154(b) by 147 days.

(21) Appl. No.: 18/202,971

(22) Filed: May 29, 2023

(65) Prior Publication Data

US 2024/0400852 A1    Dec. 5, 2024

(51) Int. Cl.

| | |
|---|---|
| *B29C 48/154* | (2019.01) |
| *B29B 9/08* | (2006.01) |
| *B29C 48/00* | (2019.01) |
| *B29C 48/12* | (2019.01) |
| *B29C 48/79* | (2019.01) |
| *B32B 21/08* | (2006.01) |
| *B32B 27/20* | (2006.01) |
| *B32B 27/30* | (2006.01) |
| *C09D 127/06* | (2006.01) |
| *B29C 48/285* | (2019.01) |
| *B29K 27/06* | (2006.01) |
| *B29K 105/00* | (2006.01) |
| *B29K 711/14* | (2006.01) |

(52) U.S. Cl.
CPC .............. *B29C 48/154* (2019.02); *B29B 9/08* (2013.01); *B29C 48/0018* (2019.02); *B29C 48/0022* (2019.02); *B29C 48/022* (2019.02); *B29C 48/12* (2019.02); *B29C 48/79* (2019.02); *B32B 21/08* (2013.01); *B32B 27/20* (2013.01); *B32B 27/304* (2013.01); *C09D 127/06* (2013.01); *B29C 48/2883* (2019.02); *B29K 2027/06* (2013.01); *B29K 2105/251* (2013.01); *B29K 2711/14* (2013.01); *B32B 2250/02* (2013.01); *B32B 2307/4026* (2013.01); *B32B 2307/712* (2013.01); *B32B 2419/00* (2013.01)

(58) Field of Classification Search
CPC ............................ B29C 48/154; B29C 48/155
See application file for complete search history.

(56) References Cited

U.S. PATENT DOCUMENTS

| | | | |
|---|---|---|---|
| 6,357,197 B1 * | 3/2002 | Serino ..................... | E06B 3/205 52/847 |
| 8,088,477 B2 * | 1/2012 | Curtis ....................... | B32B 7/12 264/45.9 |
| 9,919,503 B2 * | 3/2018 | Helton ..................... | B05D 7/06 |

FOREIGN PATENT DOCUMENTS

| | | | | |
|---|---|---|---|---|
| AU | 2023203479 B1 | * | 11/2024 | .............. B27N 3/28 |
| CN | 104210080 A | * | 12/2014 | ........... B29C 47/025 |
| CN | 104760151 A | * | 7/2015 | ........... B29C 48/288 |
| CN | 105965814 A | * | 9/2016 | ........... B29C 47/025 |
| CN | 111234384 A | * | 6/2020 | .............. C08L 23/12 |
| CN | 115946255 A | * | 4/2023 | .............. B29B 7/06 |
| EP | 4474130 A1 | | 12/2024 | |
| WO | 2019025486 A1 | | 2/2019 | |

* cited by examiner

*Primary Examiner* — Atul P. Khare

(74) *Attorney, Agent, or Firm* — Bayramoglu Law Offices LLC

(57) ABSTRACT

A process of polyvinyl chloride (PVC) cladding wood includes step 1, putting a PVC mixture into a high-speed mixer, and then cooling through a rubber powder cooler to obtain a powder; step 2, adding the powder to a granulator for granulation to produce PVC particles with uniform particle size; step 3, heating a profile to be cladded at an average speed in an extruder, melting with the PVC particles, and extruding out by a co-extrusion die to form a profile with PVC material coating on a surface of the profile; step 4, after cooling by a cooling tank, forming and tracting, cutting; the process of PVC cladding wood is completed. The process of PVC cladding wood involved in the present invention attaches the PVC coating to the outer surface of a pure wood or a wood-like profile.

7 Claims, No Drawings

PROCESS OF POLYVINYL CHLORIDE (PVC) CLADDING WOOD

TECHNICAL FIELD

The present invention belongs to the technical field of new material processing, particularly relates to a process of polyvinyl chloride (PVC) cladding wood.

BACKGROUND

Pure wood profiles or wood-like profiles are always cladded with paint on the surface in processing to meet the needs of a beautiful appearance, waterproof, or improving the weather resistance.

A ventilation window is a common decoration material. The modern decoration concept puts forward higher requirements for the function and material of ventilation windows. According to the different positions, heights, widths, and climate conditions where the ventilation windows are installed, more solid auxiliary materials are needed to match with its structure, to achieve a ventilation window with the advantages of stronger, environmentally friendly, low-cost, highly operability, and beautiful appearance.

Both PVC and natural wood ventilation windows have the following deficiencies: Due to the lack of natural fibers inside, PVC ventilation windows are easy to deform and sag when faced with a large temperature difference. Because the surface of the natural wood ventilation window is too rough, it needs to be primed on the surface first, and then polished and painted. Even after many times of polishing and painting, the surface will still have a rough feel and is not good looking. The process is complex, high cost, and not environmentally friendly. In view of the improvement of the consumer appreciation level and the trend of strict requirements for products, there is an urgent need for a cladding process to achieve the advantages of smooth and delicate surface, waterproof, moisture-proof, no mildew, non-wormy and the like, and achieve the wood material supported inside by natural fibers, better weather resistance, beautiful appearance, and other advantages. Additionally, the external auxiliary layer of the existing ventilation windows is harmful to the health of the workers in the production process, and the finished product has a great impact on the environment. In view of the shortcomings of the existing technology, it is urgent to need an environmentally friendly process to replace the paint layer.

SUMMARY

The objective of the present invention is to provide a process of PVC cladding wood.

The present invention is realized by the following technical solutions:

The present invention relates to a process of PVC cladding wood, including the following steps:
  step 1, putting a PVC mixture into a high-speed mixer, and then cooling through a rubber powder cooler to obtain a powder;
  step 2, adding the powder to a granulator for granulation to produce PVC particles with uniform particle size;
  step 3, heating a wood profile to be cladded at an average speed in an extruder, adding with the PVC particles, and extruding out by a co-extrusion die to form a profile with PVC material coating on a surface of the profile. The specific steps are as follows:

Heating the PVC particles in stages in the extruder (the temperature of the four stages of the extruder is as follows: 130° C.±10° C. at the first stage, 145° C.±10° C. at the second stage, 165° C.±10° C. at the third stage, and 190° C.±10° C. at the fourth stage); extruding the PVC particles into a co-extrusion die at an average speed under the interaction between a screw and a screw sleeve, and extruding out with the wood profile to be cladded from the co-extrusion die at the average speed (the temperature of the three stages of the co-extrusion die is as follows: 190° C.±10° C. at the first stage, 190° C.±10° C. at the second stage, and 200° C.±10° C. at the third stage). That is, the surface of the wood profile is completely covered with an adhesion layer with extremely smooth.

step 4, cooling by a cooling tank, forming and tracting, and cutting. The process of PVC cladding wood is completed.

Preferably, in step 1, the PVC mixture includes: PVC powder, $CaCO_3$, foaming agent, stabilizer, color powder, and additives; a mass ratio of the PVC powder, the $CaCO_3$, the foaming agent, the stabilizer, the color powder, and the additives is 7.7:1:0.1:0.6:0.4:0.2.

Preferably, in step 1, a cooling temperature is 60° C.

Preferably, in step 2, a structure of each of the PVC particles is a cylinder.

Preferably, a bottom area diameter of the cylinder is 2.5 mm-3.5 mm, and a height of the cylinder is 4 mm-6 mm.

Preferably, in step 3, a rotational speed of the extruder is 250-300 revolutions per minute (rpm).

Preferably, in step 3, a heating temperature is 120° C.-210° C.

Preferably, in step 4, a cooling temperature is 0° C.-16° C.

Preferably, in step 4, tracting is at a rotational speed of 25-35 rpm.

The present invention has the following advantages:

(1) The process of PVC cladding wood of the present invention attaches PVC coating to the outer surface of the pure wood or wood-like (any wood) profile, and the prepared product has the following advantages: It not only has the traditional characteristics of the smooth and delicate surface, waterproof, moisture-proof, non-mildew, non-wormy, and the like, but also is not easy to deform (tough hardness, no need to add metal to improve its hardness), and environmentally friendly (no painting process). The process cost is saved, and the environmental protection standards are greatly improved.

(2) The process of PVC cladding wood of the present invention realizes the plastic cladding wood profile. The PVC layer coated on the outer surface of the product makes the method of PVC cladding wood instead of the traditional paint polishing method. Because the method does not need the painting process, the product is energy-saving and environmentally friendly.

(3) The process of PVC cladding wood of the present invention realizes the plastic cladding wood profile, and the PVC layer coated on the outer surface of the product makes the hardness of the product greatly improved.

DETAILED DESCRIPTION OF THE EMBODIMENTS

The present invention is described in detail by combining with specific embodiments.

It should be noted that the following embodiments are only a further description of the present invention, and do not limit the scope of protection of the present invention.

Embodiment 1

This embodiment relates to a process of PVC cladding L-shaped frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (3 mm*5 mm, where q3 mm refers to a size of the bottom area diameter of each PVC particle, and 5 mm refers to a height of each PVC particle);
- step 3, the PVC particles are heated in stages in an extruder at a rotational speed of 250 rpm and extruded into a co-extrusion die at an average speed under the interaction between a screw and a screw sleeve. Then the PVC particles are extruded out with the L-shaped frame to be cladded from the co-extrusion die at the average speed. That is, the surface of the L-shaped frame to be cladded is completely covered with an adhesion layer with extremely smooth.
- step 4, after cooling by a cooling tank, forming and tracting at a rotational speed of 25 rpm, and cutting. The process of PVC cladding L-shaped frame is completed.

Further, in step 1, the PVC mixture includes: PVC powder, $CaCO_3$, foaming agent, stabilizer, color powder, and additives; a mass ratio of the PVC powder, the $CaCO_3$, the foaming agent, the stabilizer, the color powder, and the additives is 7.7:1:0.1:0.6:0.4:0.2.

Further, in step 3, a heating temperature is 120° C.

Further, in step 4, a cooling temperature is 10° C.

Embodiment 2

This embodiment relates to a process of PVC cladding Z-shaped frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ2.5 mm*4 mm);
- step 3, the PVC particles are heated in stages in an extruder at a rotational speed of 270 rpm and extruded into a co-extrusion die at an average speed under the interaction between a screw and a screw sleeve. Then the PVC particles are extruded out with the Z-shaped frame to be cladded from the co-extrusion die at the average speed. That is, the surface of the Z-shaped frame to be cladded is completely covered with an adhesion layer with extremely smooth.
- step 4, after cooling by a cooling tank, forming and tracting at a rotational speed of 30 rpm, and cutting. The process of PVC cladding Z-shaped frame is completed.

Further, in step 1, the PVC mixture includes: PVC powder, $CaCO_3$, foaming agent, stabilizer, color powder, and additives; a mass ratio of the PVC powder, the $CaCO_3$, the foaming agent, the stabilizer, the color powder, and the additives is 7.7:1:0.1:0.6:0.4:0.2.

Further, in step 3, a heating temperature is 180° C.

Further, in step 4, a cooling temperature is 16° C.

Embodiment 3

This embodiment relates to a process of PVC cladding right frame with an edge, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3.5 mm*5 mm);
- step 3, the PVC particles are heated in stages in an extruder at a rotational speed of 300 rpm and extruded into a co-extrusion die at an average speed under the interaction between a screw and a screw sleeve. Then the PVC particles are extruded out with the right frame with the edge to be cladded from the co-extrusion die at the average speed. That is, the surface of the right frame with the edge to be cladded is completely covered with an adhesion layer with extremely smooth.
- step 4, after cooling by a cooling tank, forming and tracting at a rotational speed of 35 rpm, and cutting. The process of PVC cladding right frame with the edge is completed.

Further, in step 1, the PVC mixture includes: PVC powder, $CaCO_3$, foaming agent, stabilizer, color powder, and additives; a mass ratio of the PVC powder, the $CaCO_3$, the foaming agent, the stabilizer, the color powder, and the additives is 7.7:1:0.1:0.6:0.4:0.2.

Further, in step 3, a heating temperature is 200° C.

Further, in step 4, a cooling temperature is 15° C.

Embodiment 4

This embodiment relates to a process of PVC cladding upper frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3 mm*4 mm);
- step 3, the PVC particles are heated in stages in an extruder at a rotational speed of 280 rpm and extruded into a co-extrusion die at an average speed under the interaction between a screw and a screw sleeve. Then the PVC particles are extruded out with the upper frame to be cladded from the co-extrusion die at the average speed. That is, the surface of the upper frame to be cladded is completely covered with an adhesion layer with extremely smooth.
- step 4, after cooling by a cooling tank, forming and tracting at a rotational speed of 30 rpm, and cutting. The process of PVC cladding the upper frame is completed.

Further, in step 1, the PVC mixture includes: PVC powder, $CaCO_3$, foaming agent, stabilizer, color powder, and additives; a mass ratio of the PVC powder, the $CaCO_3$, the foaming agent, the stabilizer, the color powder, and the additives is 7.7:1:0.1:0.6:0.4:0.2.

Further, in step 3, a heating temperature is 210° C.

Further, in step 4, a cooling temperature is 16° C.

Embodiment 5

This embodiment relates to a process of PVC cladding lower frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3 mm*5 mm);
- step 3, the PVC particles are heated in stages in an extruder at a rotational speed of 260 rpm and extruded into a co-extrusion die at an average speed under the interaction between a screw and a screw sleeve. Then the PVC particles are extruded out with the lower frame to be cladded from the co-extrusion die at the average speed. That is, the surface of the lower frame to be cladded is completely covered with an adhesion layer with extremely smooth.
- step 4, after cooling by a cooling tank, forming and tracting at a rotational speed of 30 rpm, and cutting. The process of PVC cladding the lower frame is completed.

Further, in step 1, the PVC mixture includes: PVC powder, CaCO$_3$, foaming agent, stabilizer, color powder, and additives; a mass ratio of the PVC powder, the CaCO$_3$, the foaming agent, the stabilizer, the color powder, and the additives is 7.7:1:0.1:0.6:0.4:0.2.

Further, in step 3, a heating temperature is 150° C.

Further, in step 4, a cooling temperature is 13° C.

Embodiment 6

This embodiment relates to a process of PVC cladding blade, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3.5 mm*6 mm);
- step 3, the PVC particles are heated in stages in an extruder at a rotational speed of 250 rpm and extruded into a co-extrusion die at an average speed under the interaction between a screw and a screw sleeve. Then the PVC particles are extruded out with the blade to be cladded from the co-extrusion die at the average speed. That is, the surface of the blade to be cladded is completely covered with an adhesion layer with extremely smooth.
- step 4, after cooling by a cooling tank, forming and tracting at a rotational speed of 25 rpm, and cutting. The process of PVC cladding blade is completed.

Further, in step 1, the PVC mixture includes: PVC powder, CaCO$_3$, foaming agent, stabilizer, color powder, and additives; a mass ratio of the PVC powder, the CaCO$_3$, the foaming agent, the stabilizer, the color powder, and the additives is 7.7:1:0.1:0.6:0.4:0.2.

Further, in step 3, a heating temperature is 120° C.

Further, in step 4, a cooling temperature is 0° C.

Embodiment 7

This embodiment relates to a process of PVC cladding right frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3.5 mm*5 mm);
- step 3, the PVC particles are heated in stages in an extruder at a rotational speed of 260 rpm and extruded into a co-extrusion die at an average speed under the interaction between a screw and a screw sleeve. Then the PVC particles are extruded out with the right frame to be cladded from the co-extrusion die at the average speed. That is, the surface of the right frame to be cladded is completely covered with an adhesion layer with extremely smooth.
- step 4, after cooling by a cooling tank, forming and tracting at a rotational speed of 28 rpm, and cutting. The process of PVC cladding right frame is completed.

Further, in step 1, the PVC mixture includes: PVC powder, CaCO$_3$, foaming agent, stabilizer, color powder, and additives; a mass ratio of the PVC powder, the CaCO$_3$, the foaming agent, the stabilizer, the color powder, and the additives is 7.7:1:0.1:0.6:0.4:0.2.

Further, in step 3, a heating temperature is 200° C.

Further, in step 4, a cooling temperature is 5° C.

Embodiment 8

This embodiment relates to a process of PVC cladding left frame, including the following steps:
- step 1, a PVC mixture is put into a high-speed mixer, and then cooled to 60° C. through a rubber powder cooler to obtain a powder;
- step 2, the powder is added to a granulator for granulation to produce PVC particles with uniform particle size (φ3 mm*5 mm);
- step 3, the PVC particles are heated in stages in an extruder at a rotational speed of 250 rpm and extruded into a co-extrusion die at an average speed under the interaction between a screw and a screw sleeve. Then the PVC particles are extruded out with the left frame to be cladded from the co-extrusion die at the average speed. That is, the surface of the left frame to be cladded is completely covered with an adhesion layer with extremely smooth.
- step 4, after cooling by a cooling tank, forming and tracting at a rotational speed of 30 rpm, and cutting. The process of PVC cladding left frame is completed.

Further, in step 1, the PVC mixture includes: PVC powder, CaCO$_3$, foaming agent, stabilizer, color powder, and additives; a mass ratio of the PVC powder, the CaCO$_3$, the foaming agent, the stabilizer, the color powder, and the additives is 7.7:1:0.1:0.6:0.4:0.2.

Further, in step 3, a heating temperature is 210° C.

Further, in step 4, a cooling temperature is 16° C.

The PVC cladding profiles referred to in the embodiments are not limited to the L-shaped frame, the Z-shaped frame, the right frame with the edge, the upper frame, the lower frame, the blade, the right frame, the left frame described above and other decorative components, but also includes profiles of different materials such as pure wood, wood-plastic, etc.

The profiles externally cladded with PVC layer are prepared by the process provided in the present invention, and the products obtained by Embodiments 1-8 is tested and compared with the products externally cladded with paint layer in terms of performance, as shown in Table 1.

TABLE 1

| Performance | Embodiment 1 | Embodiment 2 | Embodiment 3 | Embodiment 4 | Embodiment 5 |
|---|---|---|---|---|---|
| Weather resistance | 4.5 years | 5 years | 4 years | 4 years | 5 years |
| Wind resistance | Natural wind of 30 km/h, no damage | Natural wind of 45 km/h, no damage | Natural wind of 40 km/h, no damage | Natural wind of 50 km/h, no damage | Natural wind of 46 km/h, no damage |
| ultraviolet (UV) resistance | Test 500 h, and gray level is 4 | Test 500 h, and gray level is 3 | Test 500 h, and gray level is 4 | Test 500 h, and gray level is 4 | Test 500 h, and gray level is 4 |
| Environmental performance | Environmentally friendly | Environmentally friendly | Environmentally friendly | Environmentally friendly | Environmentally friendly |

| Performance | Embodiment 6 | Embodiment 7 | Embodiment 8 | Painted profile |
|---|---|---|---|---|
| Weather resistance | 4.5 years | 5 years | 5 years | 3 years |
| Wind resistance | Natural wind of 50 km/h, no damage | Natural wind of 40 km/h, no damage | Natural wind of 50 km/h, no damage | Natural wind of 20 km/h, bent |
| ultraviolet (UV) resistance | Test 500 h, and gray level is 3 | Test 500 h, and gray level is 3 | Test 500 h, and gray level is 4 | Test 500 h, and gray level is 2 |
| Environmental performance | Environmentally friendly | Environmentally friendly | Environmentally friendly | Not environmentally friendly |

Specific embodiments of the present invention are described above. It is to be understood that the present invention is not limited to the above-mentioned specific embodiments and those skilled in the art may make various variants or modifications within the scope of the claims, which does not affect the essence of the present invention.

What is claimed is:

1. A process of cladding wood with polyvinyl chloride (PVC), comprising the following steps:
   step 1, putting a PVC mixture into a high-speed mixer, and then cooling the PVC mixture to a temperature of 60° C. through a rubber powder cooler to obtain a powder;
   step 2, adding the powder to a granulator for a granulation to produce PVC particles with uniform particle size;
   step 3, heating a wood profile to be cladded in an extruder, adding the PVC particles to the extruder to form a melted PVC material, and extruding out the melted PVC material by a co-extrusion die to form a PVC material coating on the wood profile; and
   step 4, cooling the profile with the PVC material coating by a cooling tank to obtain a first resulting profile, conducting a forming and traction on the first resulting profile to obtain a second resulting profile, and cutting the second resulting profile.

2. The process according to claim 1, wherein in step 1, the PVC mixture comprises: a PVC powder, $CaCO_3$, a foaming agent, a stabilizer, a color powder, and additives; and wherein a mass ratio of the PVC powder, the $CaCO_3$, the foaming agent, the stabilizer, the color powder, and the additives is 7.7:1:0.1:0.6:0.4:0.2.

3. The process according to claim 1, wherein in step 2, a structure of each of the PVC particles is a cylinder.

4. The process according to claim 3, wherein in step 2, a bottom area diameter of the cylinder is 2.5 mm-3.5 mm, and a height of the cylinder is 4 mm-6 mm.

5. The process according to claim 1, wherein in step 3, a rotational speed of a screw of the extruder is 250-300 revolutions per minute (rpm).

6. The process according to claim 1, wherein in step 3, a temperature of the heating is 120° C.-210° C.

7. The process according to claim 1, wherein in step 4, a temperature of the cooling is 0° C.-16° C.

\* \* \* \* \*